(12) United States Patent
Spicer

(10) Patent No.: US 11,926,430 B1
(45) Date of Patent: Mar. 12, 2024

(54) MULTI-MODE AIRCRAFT POWER-SPLIT TRANSMISSION SYSTEM

(71) Applicant: Textron Innovations Inc., Providence, RI (US)

(72) Inventor: Brett Schmidt Spicer, Watauga, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/080,567

(22) Filed: Dec. 13, 2022

(51) Int. Cl.
    *B64D 35/00*     (2006.01)
    *F16H 1/28*     (2006.01)
    *F16H 57/10*     (2006.01)

(52) U.S. Cl.
    CPC ............... *B64D 35/00* (2013.01); *F16H 1/28* (2013.01); *F16H 57/10* (2013.01)

(58) Field of Classification Search
    CPC ............ B64D 35/00; F16H 1/28; F16H 57/10
    See application file for complete search history.

(56) References Cited

U.S. PATENT DOCUMENTS

| | | | | |
|---|---|---|---|---|
| 3,977,812 | A | * 8/1976 | Hudgins | B64C 27/12 416/169 R |
| 5,472,386 | A | * 12/1995 | Kish | F16H 1/28 475/903 |
| 2009/0082171 | A1 | 3/2009 | Conlon et al. | |
| 2012/0238385 | A1 | * 9/2012 | Robinette | B60K 6/445 475/5 |
| 2015/0274287 | A1 | * 10/2015 | Robertson | B64C 27/12 475/269 |
| 2021/0403168 | A1 | 12/2021 | Parsons et al. | |

\* cited by examiner

*Primary Examiner* — Justin Holmes
(74) *Attorney, Agent, or Firm* — Bradley Arant Boult Cummings LLP

(57) ABSTRACT

A multi-mode aircraft power-split-transmission system includes a rotational power input and a power-split transmission. The power-split transmission includes a sun gear, a planetary carrier, a ring gear, a first rotational power output, and a second rotational power output. The multi-mode aircraft power-split-transmission system also includes a first resistance device coupled to the first rotational power output and fixed to an airframe of the multi-mode aircraft and a second resistance device coupled to the second rotational power output and fixed to the airframe. Operation of the first resistance device causes power received from the rotational power input to be directed to the second rotational power output.

20 Claims, 2 Drawing Sheets

MULTI-MODE AIRCRAFT POWER-SPLIT TRANSMISSION SYSTEM

TECHNICAL FIELD

This disclosure relates in general to the field of aircraft operable in a plurality of propulsion modes, and more particularly, but not by way of limitation, to aircraft operable in a plurality of propulsion modes that may utilize a single powerplant and a power-split transmission.

BACKGROUND

This section provides background information to facilitate a better understanding of the various aspects of the disclosure. It should be understood that the statements in this section of this document are to be read in this light, and not as admissions of prior art.

A number of aircraft are operable in a plurality of propulsion modes. Such aircraft are referred to as multi-mode aircraft. Multi-mode aircraft include, for example, high-speed vertical takeoff and landing ("HSVTOL") aircraft and often include one or more powerplants (e.g., engines or motors) and a plurality of drive systems. In the case of a HSVTOL aircraft, for example, one or a plurality of separate powerplants and a plurality of drive systems could be used for: 1) rotors used for vertical takeoff and landing; and 2) high-speed flight propulsion. Such multi-mode aircraft often have extra unused weight, design complexity, and required maintenance present in every flight regime thereof.

SUMMARY

A multi-mode aircraft power-split-transmission system includes a rotational power input and a power-split transmission. The power-split transmission includes a sun gear, a planetary carrier, a ring gear, a first rotational power output, and a second rotational power output. The multi-mode aircraft power-split-transmission system also includes a first resistance device coupled to the first rotational power output and fixed to an airframe of the multi-mode aircraft and a second resistance device coupled to the second rotational power output and fixed to the airframe. Operation of the first resistance device causes power received from the rotational power input to be directed to the second rotational power output.

A multi-mode aircraft power-split-transmission system includes a rotational power input and a power-split transmission. The power-split transmission includes a ring gear, a first axle operable to output rotational power to a rotor of the multi-mode aircraft, and a second axle operable to output rotational power to a ducted fan of the multi-mode aircraft. The multi-mode aircraft power-split-transmission system also includes a first resistance device coupled to the first axle and fixed to an airframe of the multi-mode aircraft and a second resistance device coupled to the second axle and fixed to the airframe. Operation of the first resistance device causes power received from the rotational power input to be directed to the second rotational power output.

This summary is provided to introduce a selection of concepts that are further described below in the Detailed Description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following Detailed Description when read with the accompanying Figures. It is emphasized that, in accordance with standard practice in the industry, various features are not necessarily drawn to scale. In fact, the dimensions of various features may be arbitrarily increased or reduced for clarity of discussion.

DETAILED DESCRIPTION

Figure 1:
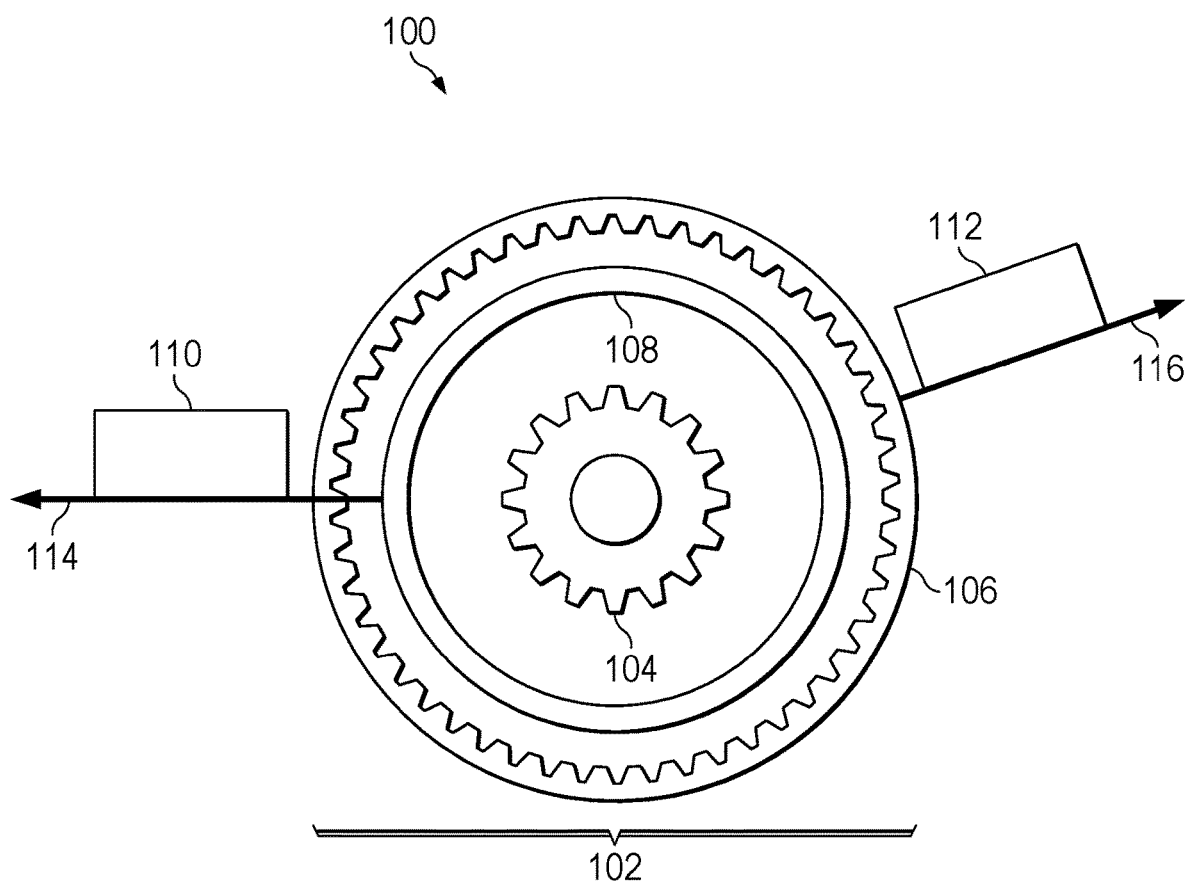
FIG. 1 illustrates a power-split-transmission system.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a Figure may illustrate an illustrative embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following Detailed Description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

A power-split transmission in a multi-mode aircraft may be used to enable a plurality of flight modes. Such flight modes may include, for example, vertical takeoff and landing ("VTOL"), low-speed forward flight, and high-speed forward flight. For purposes of this patent application, the term power-split transmission refers to a transmission that is able to direct power flow from a power input between two or more power outputs via operation of a resistance device coupled to one of the two or more power outputs of the power-split transmission.

In a power-split transmission, speed of a plurality of power outputs from a single powerplant may be controlled via devices that apply torque against a direction of rotation of the power output. For example, by applying torque to a first power output and releasing a second power output, it is possible to smoothly control a flow of power from the first power output to the second power output. In some cases, a gear pawl may be used to lock a first drive system coupled to the first power output at 0 RPM and transmit full power to a freely spinning second drive system coupled to the second power output, thereby allowing a single powerplant to switch between operating in two different propulsion modes.

FIG. 1 illustrates a power-split-transmission system 100. The power-split-transmission system 100 includes a power-split transmission 102. The power-split transmission 102 includes a sun gear 104, a planetary carrier 108, and a ring gear 106. The sun gear 104 receives an input from a multi-mode-aircraft powerplant (not shown). Also illustrated in FIG. 1 are a resistance device 110 and a resistance device 112, the resistance device 110 being coupled to the planetary carrier 108 and the resistance device 112 being coupled to the ring gear 106. A planetary-gear power output 114 is illustrated by an arrow emanating from the planetary carrier 108, while a ring-gear power output 116 is illustrated by an arrow emanating from the ring gear 106. The power-split transmission system 100 can be used to avoid, for example, the need for a turbofan powerplant for high-speed forward flight and a turboshaft powerplant for VTOL and transition in an HSVTOL aircraft.

Although FIG. 1 illustrates the power-split transmission 102 as including a planetary gearbox, the power-split-transmission system 100 may instead employ a differential-type gearbox. In either case, the power-split-transmission system 100 may be used to direct power input to the sun gear 104 between two different power outputs. For example, power may be directed from power input to the sun gear 104 from a turboshaft powerplant of a multi-mode aircraft between a power output to rotors and a power output to ducted fans. Direction between power outputs is accomplished by the power-split-transmission system 100 by resistance selectively applied by the resistance device 110 to the planetary-gear output 114 and by the resistance device 112 to the ring-gear output 116, which selectively-applied resistance may be used to control torque and rotational speed ("RPM") transmitted to a respective output. The resistance devices 110 and 112 are fixed to a structure of an airframe of the multi-mode aircraft that is stationary relative to the power outputs 114 and 116.

Many different devices such as, for example, clutches, viscous couplings, disc brakes, hydraulic pumps, and electric generators that apply a selective load may be used as the resistance devices 110 and 112 to apply resistance to control torque and RPM to the planetary-gear output 114 and the ring-gear power output 116 as noted above. In some embodiments, if masses and loads of the multi-mode aircraft allow, inertia from operation of one of the resistance device 110 and the resistance device 112 could be applied to a power output to which power is being directed. Regenerative energy-harvesting of inertia of a slowing power output can also be employed. In a typical embodiment, anywhere from 0-100% power to either output can be achieved. A gear pawl can be used to hold reaction torque at 0 RPM of a resisted power output, which could serve to reduce wear on a resistance device.

In a typical embodiment, the resistance devices 110 and 112 experience peak torque at 0 RPM and lower torque at higher RPM. Since the resistance devices 110 and 112 are typically used only while one of the power outputs 114 and 116 is being slowed, power demands placed on the resistance devices 110 and 112 can be reduced relative to demands if the resistance devices needed to operate under other conditions. The greater the resistance power of the resistance devices 110 and 112, the faster transitions between the power outputs 114 and 116 can be achieved.

Figure 2:
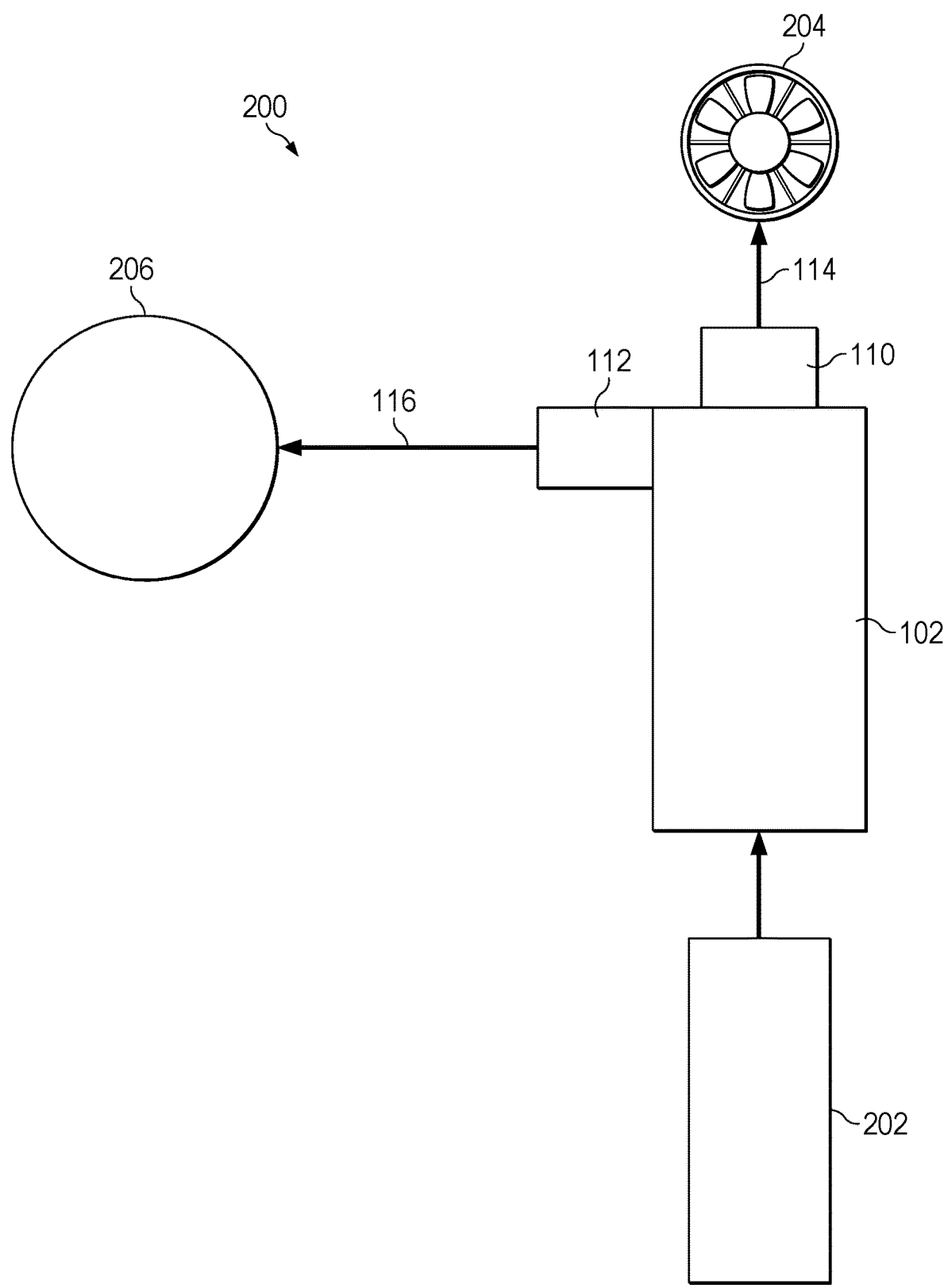
FIG. 2 is a block diagram of a multi-mode aircraft.

FIG. 2 is a block diagram of a multi-mode aircraft 200. The multi-mode aircraft 200 includes the power-split transmission 102, the resistance device 110, and the resistance device 112. Also illustrated are the planetary-gear power output 114 and the ring-gear power output 116. In addition, a turboshaft powerplant 202 is illustrated inter-operably coupled to and providing input power to the power-split transmission 102. Also shown are a ducted fan 204 that receives power from the planetary-gear power output 114 and a rotor 206 that receives power from the ring-gear power output 116.

In operation, engagement of one of the resistance devices 110 or 112 causes its respective power outputs 114 or 116 to be slowed, which causes power to the other of the respective power outputs 114 or 116 to increase, thereby facilitating a transition of torque and RPM from one of the power output 114 or 116 to the other of the power outputs 114 or 116. As noted above, in a typical embodiment, a gear pawl or other analogous device may be used to hold the power output 114 or 116 slowed to a stop at 0 RPM.

Various different arrangements of a power-split transmission can be employed without departing from the principles disclosed herein. In a typical embodiment, such as that shown in FIGS. 1 and 2, the sun gear 104 receives a power input from a powerplant such as, for example, the turboshaft 202, the planetary carrier 108 outputs power to the ducted fan 204, and the ring gear 106 outputs power to the rotor 206. However, in another embodiment, the sun gear 104 could receive the power input from the turboshaft 202, while the planetary carrier 108 outputs power to the rotor 206, and the ring gear 106 outputs power to the ducted fan 204. In similar fashion, in a differential-based, as opposed to a planetary-gear-based, embodiment, a ring gear could receive power input from a powerplant and two axles output power to the ducted fan 204 and the rotor 206, respectively.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as inboard, outboard, above, below, upper, lower, or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the terms connect, connection, connected, in connection with, and connecting may be used to mean in direct connection with. Similarly, the terms couple, coupling, and coupled may be used to mean coupled directly or via one or more elements. Conditional language used herein, such as, among others, can, might, may, e.g., and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The terms substantially, approximately, and about are each defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as substantially, approximately, and about may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term comprising within the claims is intended to mean including at least such that the recited listing of elements in a claim are an open group. The terms a, an and other singular terms are intended to include the plural forms thereof unless specifically excluded.

What is claimed is:

1. A multi-mode aircraft power-split-transmission system comprising:
    a rotational power input;
    a power-split transmission comprising:
        a sun gear;
        a planetary carrier;
        a ring gear;
        a first rotational power output; and
        a second rotational power output;
    a first resistance device coupled to the first rotational power output and fixed to an airframe of the multi-mode aircraft;
    a second resistance device coupled to the second rotational power output and fixed to the airframe; and
    wherein operation of the first resistance device causes power received from the rotational power input to be directed to the second rotational power output.

2. The multi-mode aircraft power-split-transmission system of claim 1, wherein:
    the first rotational power output drives a rotor of the multi-mode aircraft; and
    the second rotational power output drives a ducted fan of the multi-mode aircraft.

3. The multi-mode aircraft power-split-transmission system of claim 2, wherein:
    the first rotational power output is coupled to the planetary carrier; and
    the second rotational power output is coupled to the ring gear.

4. The multi-mode aircraft power-split-transmission system of claim 2, wherein:
    the second rotational power output is coupled to the planetary carrier; and
    the first rotational power output is coupled to the ring gear.

5. The multi-mode aircraft power-split-transmission system of claim 1, wherein:
    the first resistance device is a clutch; and
    the second resistance device is a clutch.

6. The multi-mode aircraft power-split-transmission system of claim 1, wherein:
    the first resistance device is a disc brake; and
    the second resistance device is a disk brake.

7. The multi-mode aircraft power-split-transmission system of claim 1, wherein one of the first resistance device and the second resistance device is a clutch and one of the first resistance device and the second resistance device is a disc brake.

8. The multi-mode aircraft power-split-transmission system of claim 1, comprising:
    a first gear pawl coupled to the first resistance device and operable to hold the first rotational power output rotationally stationary; and
    a second gear pawl coupled to the second resistance device and operable to hold the second rotational power output rotationally stationary.

9. The multi-mode aircraft power-split-transmission system of claim 1, wherein the rotational power input receives power from a turboshaft powerplant of the multi-mode aircraft.

10. The multi-mode aircraft power-split-transmission system of claim 1, wherein inertia from operation of the first resistance device is applied to the second rotational power output.

11. The multi-mode aircraft power-split-transmission system of claim 1, wherein inertia from operation of the first resistance device is applied via regenerative energy-harvesting to power a component of the multi-mode aircraft.

12. A multi-mode aircraft power-split-transmission system comprising:
    a rotational power input;
    a power-split transmission comprising:
        a ring gear;
        a first axle operable to output rotational power to a rotor of the multi-mode aircraft;
        a second axle operable to output rotational power to a ducted fan of the multi-mode aircraft;
    a first resistance device coupled to the first axle and fixed to an airframe of the multi-mode aircraft;
    a second resistance device coupled to the second axle and fixed to the airframe; and
    wherein operation of the first resistance device causes power received from the rotational power input to be directed to the second rotational power output.

13. The multi-mode aircraft power-split-transmission system of claim 12, wherein the rotational power input is coupled to the ring gear.

14. The multi-mode aircraft power-split-transmission system of claim 12, wherein:
    the first resistance device is a clutch; and
    the second resistance device is a clutch.

15. The multi-mode aircraft power-split-transmission system of claim 12, wherein:
    the first resistance device is a disc brake; and
    the second resistance device is a disk brake.

16. The multi-mode aircraft power-split-transmission system of claim 12, wherein one of the first resistance device and the second resistance device is a clutch and one of the first resistance device and the second resistance device is a disc brake.

17. The multi-mode aircraft power-split-transmission system of claim 12, comprising
    a first gear pawl coupled to the first resistance device and operable to hold the first axle rotationally stationary.

18. The multi-mode aircraft power-split-transmission system of claim 12, wherein the rotational power input receives power from a turboshaft powerplant of the multi-mode aircraft.

19. The multi-mode aircraft power-split-transmission system of claim 12, wherein inertia from operation of the first resistance device is applied to the second axle.

20. The multi-mode aircraft power-split-transmission system of 17, comprising a second gear pawl coupled to the second resistance device and operable to hold the second axle rotationally stationary.

* * * * *